(12) United States Patent
Shu et al.

(10) Patent No.: US 11,121,619 B2
(45) Date of Patent: Sep. 14, 2021

(54) BUS VOLTAGE SECONDARY RIPPLE SUPPRESSION METHOD AND DEVICE

(71) Applicant: SMA Solar Technology AG, Niestetal (DE)

(72) Inventors: Chengwei Shu, Suzhou (CN); Jiayu Yao, Suzhou (CN); Shijun Li, Suzhou (CN); Jin Cheng, Suzhou (CN)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/898,913

(22) Filed: Jun. 11, 2020

(65) Prior Publication Data

US 2020/0304014 A1 Sep. 24, 2020

Related U.S. Application Data

(63) Continuation of application No. PCT/EP2018/084626, filed on Dec. 12, 2018.

(30) Foreign Application Priority Data

Dec. 13, 2017 (CN) .......................... 201711330704.5

(51) Int. Cl.
*H02M 1/14* (2006.01)
*H02M 1/08* (2006.01)
(Continued)

(52) U.S. Cl.
CPC .............. *H02M 1/14* (2013.01); *H02M 1/08* (2013.01); *H02M 1/15* (2013.01); *H02M 3/156* (2013.01); *H02M 7/537* (2013.01)

(58) Field of Classification Search
CPC .......... H02M 2001/007; H02M 1/158; H02M 3/156; H02M 7/48; H02M 7/537;
(Continued)

(56) References Cited

U.S. PATENT DOCUMENTS 6,944,034 B1 * 9/2005 Shteynberg ....... H02M 3/33523
363/21.13
10,020,724 B2 7/2018 Weida
(Continued)

OTHER PUBLICATIONS

Maheri etl al. High Step-Up DC-DC Converter With Minimum Output Voltage Ripple, 3568 IEEE Transactions on Industrial Electronics, vol. 64, No. 5, May 2017 (Year: 2017).*
(Continued)

*Primary Examiner* — Gustavo A Rosario-Benitez
(74) *Attorney, Agent, or Firm* — Eschweiler & Potashnik, LLC

(57) ABSTRACT

The disclosure discloses a bus voltage secondary ripple suppression method and a bus voltage secondary ripple suppression device. The method includes: determining a current working mode of an inverter Boost circuit; wherein the working mode includes a continuous current mode (CCM) and a discontinuous current mode (DCM); calculating an output compensation amount according to the current working mode of the inverter Boost circuit; superimposing the output compensation amount on a control output amount of the Boost circuit; and controlling the Boost circuit by a control output amount superimposed with an output compensation amount. According to the scheme of this embodiment, the third harmonic in the output current of the inverter is reduced, and the current output quality of the inverter is improved.

6 Claims, 5 Drawing Sheets

Determine a current working mode of an inverter Boost circuit; wherein the working mode includes a continuous current (CCM) mode and a discontinuous current (DCM) mode — S101

Calculate an output compensation amount according to the current working mode of the inverter Boost circuit — S102

Superimpose the output compensation amount on a control output amount of the Boost circuit — S103

Control the Boost circuit through the control output amount superimposed with the output compensation amount — S104

(51) Int. Cl.
*H02M 7/537* (2006.01)
*H02M 3/156* (2006.01)
*H02M 1/15* (2006.01)

(58) Field of Classification Search
CPC .. H02M 7/5387; H02M 7/53871; H02M 1/08; H02M 1/4225; H02M 1/425; H02M 1/4258; H02M 1/14; H02M 1/143; H02M 1/15
See application file for complete search history.

(56) References Cited

U.S. PATENT DOCUMENTS

| | | | | |
|---|---|---|---|---|
| 2008/0084721 A1* | 4/2008 | Miramonti | ............ | H02M 3/156 363/89 |
| 2008/0284398 A1* | 11/2008 | Qiu | ........ | H02M 3/156 323/283 |
| 2011/0273157 A1* | 11/2011 | Abu-Qahouq | ........ | H02M 3/156 323/299 |
| 2013/0038310 A1* | 2/2013 | Menegoli | .............. | H02M 3/156 323/288 |
| 2014/0266135 A1* | 9/2014 | Zhak | ............ | H02M 3/158 323/311 |
| 2015/0102759 A1* | 4/2015 | Shimomugi | ........ | H02M 1/4216 318/504 |

OTHER PUBLICATIONS

Wang et al. A grid connected photovoltaic system with irradiation injected current control, The 7th international conference on Power electronics Oct. 22-26, 2007 (Year: 2007).*

* cited by examiner

BUS VOLTAGE SECONDARY RIPPLE SUPPRESSION METHOD AND DEVICE

CROSS REFERENCE TO RELATED APPLICATIONS

This application is a continuation of International Patent Application number PCT/EP2018/084626, filed on Dec. 12, 2018, which claims priority to Chinese Patent Application number 201711330704.5, filed on Dec. 13, 2017, and is hereby incorporated by reference in its entirety.

FIELD

Embodiments of the disclosure relate to an instantaneous power control technology, in particular to a bus voltage secondary ripple suppression method and device.

BACKGROUND

Single-phase power supply equipment is widely used in life, but its power output quality will be adversely affected for many reasons, among which the bus voltage secondary ripple is a main cause of a large third harmonic of the output current. When a power factor (PF) of single-phase inverter is equal to 1, the alternating current (AC) power of the single-phase inverter is calculated as follows:

$$P = U*I; \quad \text{Relation 1}$$

$$U = \sqrt{2} * U_{Rms} * \sin(\omega t); \quad \text{Relation 2}$$

$$I = \sqrt{2} * I_{Rms} * \sin(\omega t); \quad \text{Relation 3}$$

where P is an AC instantaneous power; U is an instantaneous voltage; I is an instantaneous current; $U_{Rms}$ is an effective value of the voltage; $I_{Rms}$ is an effective value of current; and $\omega$ is a rotational frequency.

From the relations 1, 2 and 3, it can be deduced that:

$$P = U^*I = \sqrt{2} * U_{Rms} * \sin(\omega t)^* \sqrt{2} * I_{Rms} * \sin(\omega t) =$$
$$U_{Rms} * I_{Rms} * [1 - \cos(2\omega t)] = U_{Rms} * I_{Rms} * [1 - \cos(2\pi f (f = 50)t)]$$

Therefore, the AC power is a pulsating power with a frequency of 100 Hz (when the working frequency is 50 Hz). Because of the topology of a single-phase inverter, there is a ripple of 100 Hz (i.e. secondary ripple) on bus voltage. Due to the control by the single-phase inverter, this secondary ripple, after control by the inverter, will generate the third harmonic on the output current, thus adversely affecting the output current harmonic (Thdi) and power quality of the inverter.

The control block diagram of the single-phase inverter is shown in FIG. 1, where 1a is a bus voltage reference; 1b is a PI controller; 1c is a current reference; 1d is a sin trigonometric function; 1e is a current closed-loop controller; 1f is an equivalent impedance; and 1g is a feedback function.

SUMMARY

In order to solve the above technical problems, embodiments of the disclosure provide a bus voltage secondary ripple suppression method and device, which can reduce the third harmonic in the output current of the inverter and improve the current output quality of the inverter.

In order to achieve the purpose of embodiments of the present disclosure, an embodiment of the present disclosure provides a bus voltage secondary ripple suppression method, which includes:

determining a current working mode of an inverter Boost circuit; wherein the working mode includes a continuous current mode (CCM) and a discontinuous current mode (DCM);

calculating an output compensation amount according to the current working mode of the inverter Boost circuit;

superimposing the output compensation amount on a control output amount of Boost circuit;

controlling the Boost circuit through the control output amount superimposed with the output compensation amount.

Optionally, determining the current working mode of the inverter Boost circuit includes:

determining that the inverter Boost circuit is in the CCM mode when a DC bus voltage Udc and a DC input photovoltaic (PV) voltage Upv of the inverter Boost circuit meet:

$$U_{dc}*(1-D_0)=U_{pv};$$

determining that the inverter Boost circuit is in the DCM mode when the DC bus voltage $U_{dc}$ and the DC input PV voltage $U_{pv}$ of the inverter Boost circuit meet:

$$U_{dc}*(1-D)>U_{pv}$$

wherein $D_0$ is a duty ratio of Pulse Width Modulation (PWM).

Optionally, calculating the output compensation amount according to the current working mode of the inverter Boost circuit includes:

in the CCM mode, obtaining respectively a first calculation formula corresponding to a current flowing through an inductor when there is no voltage fluctuation on a DC bus and a second calculation formula corresponding to a current flowing through the inductor when there is voltage fluctuation on the DC bus;

obtaining a first PWM compensation duty ratio by combining the first calculation formula and the second calculation formula;

using the first PWM compensation duty ratio as an output compensation amount in the CCM mode.

Optionally, when there is no PV voltage fluctuation:
the first calculation formula includes:

$$\Delta I_{L1} = \frac{1}{L}[U_{pv} * D_0 * T - (\overline{U_{dc}} - U_{pv}) * (1 - D_0) * T];$$

the second calculation formula includes:

$$\Delta I_{L2} = \frac{1}{L}\{U_{pv} * (D_0 + \Delta D1) * T - [(\overline{U_{dc}} + \widetilde{U_{dc}}) - U_{pv}] * [1 - (D_0 + \Delta D1)] * T\};$$

the first PWM compensation duty ratio includes:

$$\Delta D1 = \frac{U_{dc} - \overline{U_{dc}}}{U_{dc}} * (1 - D_0);$$

where $\Delta I_{L1}$ is the current flowing through the inductor when there is no voltage fluctuation on the DC bus in the CCM mode; $\Delta I_{L2}$ is the current flowing through the inductor when there is voltage fluctuation on the DC bus in the CCM mode; L is an inductance value of the inductor; $U_{pv}$ is the PV voltage; T is a PWM period; $U_{dc}$ is a DC bus voltage; $\overline{U_{dc}}$ is a DC magnitude of the DC bus voltage; $\widetilde{U_{dc}}$ is an alternating current (AC) magnitude of the DC bus voltage; $\Delta D1$ is a first PWM compensation duty ratio.

Optionally, when there is PV voltage fluctuation:

$$U_{pv} = \overline{U_{pv}} + \widetilde{U_{pv}};$$

the first calculation formula includes:

$$\Delta I_{L1} = \frac{1}{L}[\overline{U_{pv}} * D_0 * T - (\overline{U_{dc}} - \overline{U_{pv}}) * (1 - D_0) * T];$$

the second calculation formula includes:

$$\Delta I_{L2} = \frac{1}{L}\{(\overline{U_{pv}} + \widetilde{U_{pv}}) * (D_0 + \Delta D1) * T - [(\overline{U_{dc}} + \widetilde{U_{dc}}) - (\overline{U_{pv}} + \widetilde{U_{pv}})] * [1 - (D_0 + \Delta D1)] * T\},$$

the first PWM compensation duty ratio includes:

$$\Delta D1 = \frac{(U_{dc} - \overline{U_{dc}}) * (1 - D_0) - (U_{pv} - \overline{U_{pv}})}{U_{dc}};$$

where $\overline{U_{pv}}$ is a DC magnitude of the PV voltage; $\widetilde{U_{pv}}$ is an AC magnitude of the PV voltage.

Optionally, when there is no PV voltage fluctuation, calculating the output compensation amount according to the current working mode of the inverter Boost circuit further includes:

in the DCM mode, obtaining respectively a third calculation formula corresponding to a discharge current of the Boost circuit when the circuit is opened and a fourth calculation formula corresponding to a charge current of the Boost circuit when the circuit is closed.

obtaining a periodic average current of the Boost circuit by combining to the third calculation formula with the fourth calculation formula;

obtaining respectively a fifth calculation formula corresponding to a current flowing through the inductor when there is no voltage fluctuation on the DC bus and a sixth calculation formula corresponding to a current flowing through the inductor when there is voltage fluctuation on the DC bus, according to the periodic average current;

obtaining a second PWM compensation duty ratio by combining the fifth calculation formula and the sixth calculation formula;

using the second PWM compensation duty ratio as the output compensation amount in the DCM mode.

Optionally, the third calculation formula includes:

$$I_{off} = \frac{(U_{dc} - U_{pv}) * T'}{L};$$

the fourth calculation formula includes:

$$I_{on} = \frac{U_{pv} * D_0 * T}{L};$$

the periodic average current of Boost circuit includes:

$$\bar{I} = \frac{U_{pv} * U_{dc} * D_0^2 * T}{L * (U_{dc} - U_{pv})};$$

the fifth calculation formula includes:

$$\Delta I_{L3} = \frac{U_{pv} * \overline{U_{dc}} * D_0^2 * T}{L * (\overline{U_{dc}} - U_{pv})};$$

the sixth calculation formula includes:

$$\Delta I_{L4} = \frac{U_{pv} * (\overline{U_{dc}} + \widetilde{U_{dc}}) * (D_0 + \Delta D2)^2 * T}{L * (\overline{U_{dc}} + \widetilde{U_{dc}} - U_{pv})};$$

the second PWM compensation duty ratio includes:

$$\Delta D2 = \frac{(U_{dc} - \overline{U_{dc}} + U_{pv}) * D_0}{2 * (\overline{U_{dc}} - U_{pv}) * U_{dc}};$$

where $\bar{I}$ is the periodic average current of the Boost circuit; $I_{on}$ is a charge current of the inductor; $I_{off}$ is a discharge current of the inductor; T' is discharge time of the inductor; $\Delta I_{L3}$ is a current flowing through the inductor when there is no voltage fluctuation on the DC bus in a case that there is no the PV voltage fluctuation in the DCM mode; $\Delta I_{L4}$ is a current flowing through the inductor when there is voltage fluctuation on the DC bus in a case that there is no the PV voltage fluctuation in the DCM mode; $\Delta D2$ is a second PWM compensation duty ratio.

Optionally, when there is PV voltage fluctuations:

calculating the output compensation amount according to the current working mode of the inverter Boost circuit further includes:

in the DCM mode, obtaining respectively a seventh calculation formula corresponding to a current flowing through the inductor when there is no voltage fluctuation on the DC bus and an eighth calculation formula corresponding to a current flowing through the inductor when there is voltage fluctuation on the DC bus;

obtaining a second PWM compensation duty ratio by combining the seventh calculation formula and the eighth calculation formula;

using the second PWM compensation duty ratio as the output compensation amount in the DCM mode.

Optionally, the seventh calculation formula includes:

$$\Delta I_{L5} = \frac{(\overline{U_{pv}} * \overline{U_{dc}}) * D_0^2 * T}{L * (\overline{U_{dc}} - \overline{U_{pv}})};$$

the eighth calculation formula includes:

$$\Delta I_{L6} = \frac{\left[\left(\overline{U_{pv}} + \widetilde{U_{pv}}\right) * \left(\overline{U_{dc}} + \widetilde{U_{dc}}\right)\right] * (D_0 + \Delta D2)^2 * T}{L * \left[\left(\overline{U_{dc}} + \widetilde{U_{dc}}\right) - \left(\overline{U_{pv}} + \widetilde{U_{pv}}\right)\right]};$$

the second PWM compensation duty ratio includes:

$$\Delta D2 = \frac{\overline{U_{pv}}^2 * (U_{dc} - \overline{U_{dc}}) - \overline{U_{dc}}^2 * (U_{pv} - \overline{U_{pv}}) - (U_{pv} - \overline{U_{pv}}) * (U_{dc} - \overline{U_{dc}}) * (\overline{U_{dc}} - \overline{U_{pv}})}{2 * U_{pv} * U_{dc} * (\overline{U_{dc}} - \overline{U_{pv}})} * D_0;$$

where $\Delta I_{L5}$ is a current flowing through the inductor when there is no voltage fluctuation on the DC bus in a case that there is the PV voltage fluctuation in the DCM mode; $\Delta I_{L6}$ is a current flowing through the inductor when there is the voltage fluctuation on the DC bus n a case that there is the PV voltage fluctuation in the DCM mode.

An embodiment of the disclosure also provides a bus voltage secondary ripple suppression device, which includes:

a determination module configured to determine a current working mode of an inverter Boost circuit; wherein the working mode includes a continuous current mode (CCM) and a discontinuous current mode (DCM);

a calculation module configured to calculate an output compensation amount according to the current working mode of the inverter Boost circuit;

a compensation module configured to superimpose the output compensation amount on a control output amount of Boost circuit; and a control module configured to control the Boost circuit through the control output amount superimposed with the output compensation amount.

An embodiment of the disclosure includes: determining the current working mode of the inverter Boost circuit, wherein the working mode includes a CCM mode and a DCM mode; calculating the output compensation amount according to the current working mode of the inverter Boost circuit; superimposing the output compensation amount on the control output amount of the Boost circuit; controlling the Boost circuit through a control output amount superimposed with the output compensation amount. According to the scheme of this embodiment, the third harmonic in the output current of the inverter is reduced, and the current output quality of the inverter is improved.

Other features and advantages of embodiments of the present disclosure will be set forth in the following description, and parts of features and advantages will become apparent from the description, or may be learned by performing embodiments of the present disclosure. Objects and other advantages of embodiments of the present disclosure may be realized and obtained by structures particularly pointed out in the specification, claims and drawings.

BRIEF DESCRIPTION OF THE DRAWINGS

The drawings are intended to provide a further understanding of the technical scheme of the embodiments of the present disclosure and form a part of the specification, and are used to explain the technical scheme of the present disclosure together with the embodiments of the present application, but do not constitute a limitation on the technical scheme of the embodiments of the present disclosure.

DETAILED DESCRIPTION

In order to make the object, technical scheme and advantages of the embodiments of the present disclosure more clear, embodiments of the present disclosure will be described in detail below with reference to the accompanying drawings. It should be noted that embodiments in this application and features in the embodiments can be arbitrarily combined with each other without conflict.

The steps shown in the flowchart of the drawings may be performed in a computer system such as a group of computer-executable instructions. Further, although a logical order is shown in the flowchart, in some cases the steps shown or described may be performed in an order different from here.

Figure 1:
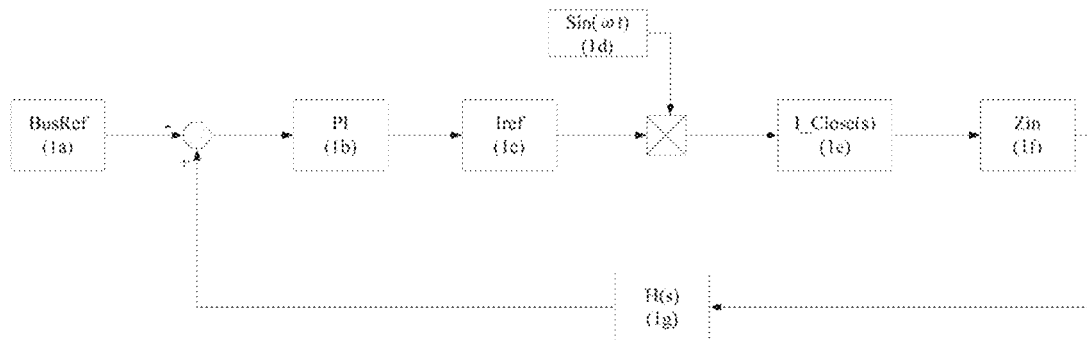
FIG. 1 is a control block diagram of a conventional single-phase inverter.
Figure 2:
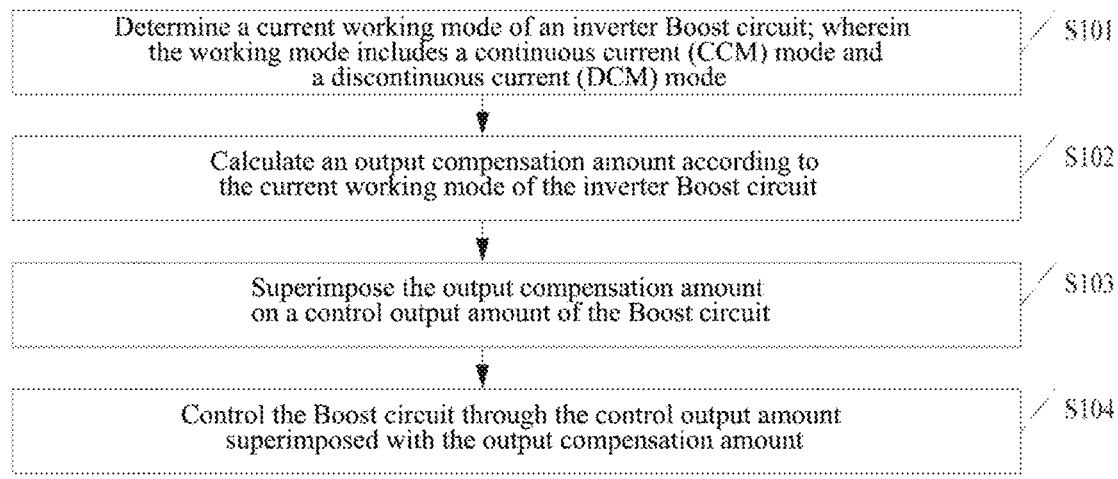
FIG. 2 is a flowchart of a bus voltage secondary ripple suppression method according to an embodiment of the present disclosure.

In order to achieve the purpose of embodiments of the present disclosure, as shown in FIG. 2, an embodiment of the present disclosure provides a bus voltage secondary ripple suppression method, which includes steps S101-S104.

In S101, a current working mode of an inverter Boost circuit is determined; wherein the working mode includes a continuous current mode (CCM) and a discontinuous current mode (DCM).

Optionally, determining the current working mode of the inverter Boost circuit may include:

when the DC bus voltage $U_{dc}$ and the DC input PV voltage $U_{pv}$ of the inverter Boost circuit meet: $U_{dc}*(1-D_0)=U_{pv}$, it is determined that the inverter Boost circuit is in the CCM mode;

it is determined that the inverter Boost circuit is in the DCM mode when the DC bus voltage and the DC input PV voltage of the inverter Boost circuit meet: $U_{dc}*(1-D_0)>U_{pv}$;

wherein $D_0$ is a duty ratio of Pulse Width Modulation (PWM).

In an embodiment of the disclosure, according to the working principle of Boost, the bus DC voltage ($U_{dc}$) and the DC input PV voltage ($U_{pv}$) satisfy the formula:

$$U_{dc} = \frac{U_{pv}}{(1-D_0)};$$

according to the working principle of Boost, when $U_{dc}*(1-D_0)=U_{pv}$, the Boost circuit is in the CCM mode; when $U_{dc}*(1-D_0)>U_{pv}$, the Boost circuit is in the DCM mode.

In S102, an output compensation amount is calculated according to the current working mode of the inverter Boost circuit.

In an embodiment of the present disclosure, according to the contents of background art, power $P=U_{Rms}*I_{Rms}*[1-\cos(2\omega t)]$, periodic power $\overline{P}=U_{Rms}*I_{Rms}$, and there is power fluctuation $\Delta P$ for the transient state, wherein, $$\Delta P = U_{Rms}*I_{Rms} - U_{Rms}*I_{Rms}*[1-\cos(2\omega t)] = U_{Rms}*I_{Rms}*\cos(2\omega t) \quad \text{relation 4}$$

In an embodiment of the present disclosure, it is also known that $\Delta P = U_{dc}*I_{dc}$, $$I_{dc} = C_{bus}\frac{d(U_{dc})}{d(t)},$$

so that $$\Delta P = U_{dc}*C_{bus}\frac{d(U_{dc})}{d(t)}$$

is obtained; wherein, DC bus voltage Udc is composed of DC voltage ($\overline{U_{dc}}$) and small component AC voltage ($\widetilde{U_{dc}}$), so $U_{dc} = \overline{U_{dc}} + \widetilde{U_{dc}}$ : $C_{bus}$ refers to DC bus capacitance of the current inverter.

In an embodiment of the present disclosure, it can be seen from the above that under the limit conditions, $$\Delta P = U_{dc}*C_{bus}\frac{d(U_{dc})}{d(t)} = \quad \text{relation 5}$$
$$(\overline{U_{dc}}+\widetilde{U_{dc}})*C_{bus}\frac{d(\overline{U_{dc}}+\widetilde{U_{dc}})}{d(t)} = (\overline{U_{dc}}+\widetilde{U_{dc}})*C_{bus}\frac{d(\widetilde{U_{dc}})}{d(t)}$$

By combining the relation 4 and relation 5, the following can be obtained:

$$(\overline{U_{dc}}+\widetilde{U_{dc}})*C_{bus}\frac{d(\widetilde{U_{dc}})}{d(t)} = U_{Rms}*I_{Rms}*\cos(2\omega t)$$

$$(\overline{U_{dc}}+\widetilde{U_{dc}})*\frac{d(\widetilde{U_{dc}})}{d(t)} = \frac{U_{Rms}*I_{Rms}*\cos(2\omega t)}{C_{bus}}$$

By integrating on both sides of the equal sign, the following can be derived:

$$\widetilde{U_{dc}} = \sqrt{\frac{\overline{P}*\sin(2\omega t)}{C_{bus}*\omega} + (\overline{U_{dc}})^2} - \overline{U_{dc}} \quad \text{relation 6}$$

In an embodiment of the present disclosure, based on the above basic knowledge, the output compensation amount can be calculated according to the current working mode of the inverter Boost circuit under cases of considering PV voltage fluctuation and not considering PV voltage fluctuation respectively.

Case 1. PV voltage fluctuation is not considered
1. Boost Works in the CCM Mode.

Optionally, calculating the output compensation amount according to the current working mode of the inverter Boost circuit may include S201-S203.

In S201, in the CCM mode, a first calculation formula corresponding to a current flowing through an inductor when there is no voltage fluctuation on the DC bus and a second calculation formula corresponding to a current flowing through the inductor when there is voltage fluctuation on the DC bus are obtained respectively.

In an embodiment of the disclosure, the expression of the current flowing through the inductor when there is no voltage fluctuation on the DC bus is as follows, i.e. the first calculation formula includes:

$$\Delta I_{L1} = \frac{1}{L}[U_{pv}*D_0*T - (\overline{U_{dc}} - U_{pv})*(1-D_0)*T] \quad \text{relation 7}$$

In an embodiment of the present disclosure, the expression of the current flowing through the inductor with or without voltage fluctuation of the DC bus is as follows, that is, the second calculation formula includes:

$$\Delta I_{L2} = \frac{1}{L}\{U_{pv}*(D_0+\Delta D1)* \quad \text{relation 8}$$
$$T - [(\overline{U_{dc}}+\widetilde{U_{dc}}) - U_{pv}]*[1-(D_0+\Delta D1)]*T\}$$

Herein, $\Delta I_{L1}$ is the current flowing through the inductor when there is no voltage fluctuation on the DC bus in the CCM mode; $\Delta I_{L2}$ is the current flowing through the inductor when there is voltage fluctuation on the DC bus in the CCM mode; L is an inductance value of the inductor; $U_{pv}$ is the PV voltage; T is a PWM period; $U_{dc}$ is a DC bus voltage; $\overline{U_{dc}}$ is a DC magnitude of the DC bus voltage; $\widetilde{U_{dc}}$ is an alternating current (AC) magnitude of the DC bus voltage; $\Delta D1$ is a first PWM compensation duty ratio.

In S202, the first calculation formula and the second calculation formula are combined to obtain the first PWM compensation duty ratio.

In an embodiment of the present disclosure, the relation 7 and the relation 8 are combined, that is, letting the relation 7=the relation 8, to obtain through deduction:

$$\Delta D1 = \frac{\widetilde{U_{dc}}}{\overline{U_{dc}}+\widetilde{U_{dc}}}*(1-D_0) = \frac{U_{dc} - \overline{U_{dc}}}{U_{dc}}*(1-D_0).$$

That is, the first PWM compensation duty ratio includes:

$$\Delta D1 = \frac{U_{dc} - \overline{U_{dc}}}{U_{dc}}*(1-D_0). \quad \text{relation 9}$$

In an embodiment of the present disclosure, the two relations can be equal because the relation 8 is obtained by adding compensation, however, only fluctuation is reduced while not affecting the value of current flowing through the inductor.

In S203, the first PWM compensation duty ratio is used as the output compensation amount in the CCM mode.

2. Boost Works in the DCM Mode.

Optionally, when there is no PV voltage fluctuation, calculating the output compensation amount according to the current working mode of the inverter Boost circuit also includes S301-S305.

In S301, in the DCM mode, a third calculation formula corresponding to a discharge current of the Boost circuit when the circuit is opened and a fourth calculation formula corresponding to a charge current of the Boost circuit when the circuit is closed are obtained respectively.

Figure 3A:
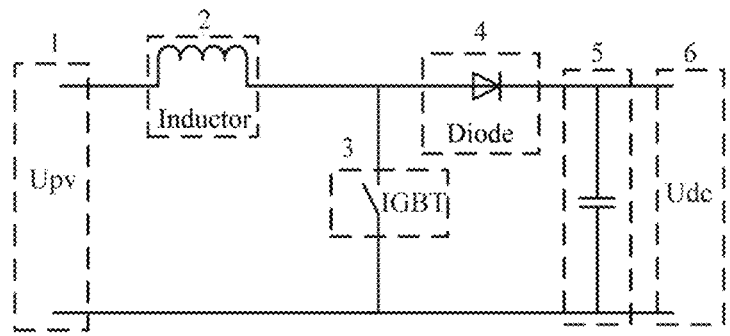
FIG. 3(a) is a schematic diagram of an open state of IGBT in the boost working circuit according to an embodiment of the present disclosure.
Figure 3B:
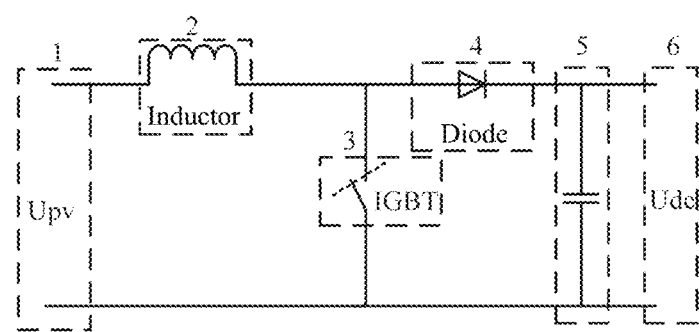
FIG. 3(b) is a schematic diagram of a closed state of IGBT in the boost working circuit according to an embodiment of the present disclosure.

In an embodiment of the present disclosure, Boost works in the DCM mode and it is discussed in two moments, i.e., a moment when Insulated Gate Bipolar Transistor (IGBT) is opened and a moment when the IGBT is closed, as shown in FIG. 3 (a) and FIG. 3 (b). When the IGBT is opened, the inductor is discharged; when IGBT is closed, inductor is charged. As the charging and discharging currents are equal, the following conditions are met:

$$I_{on} = I_{off}$$
$$I_{on} = \frac{U_{pv} * D_0 * T}{L}$$
$$I_{off} = \frac{(U_{dc} - U_{pv}) * T'}{L};$$

That is, the third calculation formula includes:

$$I_{off} = \frac{(U_{dc} - U_{pv}) * T'}{L};$$

the fourth calculation formula includes:

$$I_{on} = \frac{U_{pv} * D_0 * T}{L},$$

wherein Ion is a charge current of the inductor; Ioff is a discharge current of the inductor; T' is a discharge time of inductor.

In S302, a third calculation formula and a fourth calculation formula are combined to obtain a periodic average current of the Boost circuit.

In an embodiment of the present disclosure, the above relations can be combined to obtain $$T' = \frac{U_{pv}}{U_{dc} - U_{pv}} D_0 * T.$$

In an embodiment of the present disclosure, because it is in the DCM mode, $T' < (1-D_0)*T$, and there is no current during the time $(1-D_0)*T-T'$. Therefore, the periodic average current of the Boost circuit satisfies:

$$\bar{I} = \frac{I_{on}*D_0*T + I_{off}*T' + 0*[(1-D_0)*T - T']}{2*T} = \frac{U_{pv}*U_{dc}*D_0^2*T}{L*(U_{dc} - U_{pv})} \quad \text{relation 10}$$

That is, the periodic average current of the Boost circuit includes:

$$\bar{I} = \frac{U_{pv} * U_{dc} * D_0^2 * T}{L * (U_{dc} - U_{pv})}.$$

In S303, according to the periodic average current, a fifth calculation formula corresponding to the current flowing through the inductor when there is no voltage fluctuation on the DC bus and a sixth calculation formula corresponding to the current flowing through the inductor when there is voltage fluctuation on the DC bus are obtained respectively.

In an embodiment of the disclosure, according to the calculation formula of the periodic average current of the Boost circuit described above, the current $\Delta I_{L3}$ flowing through the inductor meets the fifth calculation formula when there is no voltage fluctuation on the DC bus in a case that there is no PV voltage fluctuation in the DCM mode;

The fifth calculation formula includes:

$$\Delta I_{L3} = \frac{U_{pv} * \overline{U_{dc}} * D_0^2 * T}{L * (\overline{U_{dc}} - U_{pv})} \quad \text{relation 11}$$

In an embodiment of the disclosure, according to the calculation formula of the periodic average current of the Boost circuit described above, the current $\Delta I_{L4}$ flowing through the inductor meets the sixth calculation formula when there is voltage fluctuation on the DC bus in a case that there is no PV voltage fluctuation in the DCM mode.

The sixth calculation formula includes:

$$\Delta I_{L4} = \frac{U_{pv} * (\overline{U_{dc}} + \widetilde{U_{dc}}) * (D_0 + \Delta D2)^2 * T}{L * (\overline{U_{dc}} + \widetilde{U_{dc}} - U_{pv})} \quad \text{relation 12}$$

It should be noted that $\Delta D2$ is a second PWM compensation duty ratio, that is, a compensation amount for a case that Boost works in the DCM mode without considering PV voltage fluctuations.

In S304, the fifth calculation formula and the sixth calculation formula are combined to obtain the second PWM compensation duty ratio.

In an embodiment of the present disclosure, relational expression 11 and relational expression 12 are combined, that is, letting relational expression 11=relational expression 12, to obtain:

$$D_0^2 + 2*D_0*\Delta D2 + \Delta D2^2 = \frac{\overline{U_{dc}} * D_0^2 * (\overline{U_{dc}} + \widetilde{U_{dc}} - U_{pv})}{(\overline{U_{dc}} - U_{pv}) * (\overline{U_{dc}} + \widetilde{U_{dc}})}.$$

In an embodiment of the disclosure, because the compensation amount $\Delta D2$ is of a small value, the influence of $\Delta D2^2$ can be ignored, and it can be simplified as:

$$\Delta D2 = \frac{(\widetilde{U_{dc}} + U_{pv}) * D_0}{2*(\overline{U_{dc}} - U_{pv})*(\overline{U_{dc}} + \widetilde{U_{dc}})} = \frac{(U_{dc} - \overline{U_{dc}} + U_{pv})*D_0}{2*(\overline{U_{dc}} - U_{pv})*U_{dc}} \quad \text{relation 13}$$

That is, the second PWM compensation duty ratio includes:

$$\Delta D2 = \frac{(\widetilde{U_{dc}} + U_{pv})*D_0}{2*(\overline{U_{dc}} - U_{pv})*(\overline{U_{dc}} + \widetilde{U_{dc}})} = \frac{(U_{dc} - \overline{U_{dc}} + U_{pv})*D_0}{2*(\overline{U_{dc}} - U_{pv})*U_{dc}}.$$

In S305, the second PWM compensation duty ratio is used as the output compensation amount in the DCM mode.

In an embodiment of the present disclosure, combining the above cases 1 and 2 without considering the PV voltage fluctuation, the boost control PWM compensation duty ratio can be obtained as follows:

$$\Delta D = \begin{cases} \dfrac{U_{dc} - \overline{U_{dc}}}{U_{dc}} *(1 - D_0) & \text{CCM mode} \\ \dfrac{(U_{dc} - \overline{U_{dc}} + U_{pv})*D_0}{2*(\overline{U_{dc}} - U_{pv})*U_{dc}} & \text{DCM mode} \end{cases}$$

Case 2. Considering PV voltage fluctuation, now there is $U_{pv} = \overline{U_{pv}} + \widetilde{U_{pv}}$, where $\overline{U_{pv}}$ is the DC magnitude of PV voltage; $\widetilde{U_{pv}}$ is the AC magnitude of PV voltage.

1. Boost Works in the CCM Mode.

Optionally, calculating the output compensation amount according to the current working mode of the inverter Boost circuit may include S401-S403.

In S401, in the CCM mode, a first calculation formula corresponding to the current flowing through the inductor when there is no voltage fluctuation on the DC bus and a second calculation formula corresponding to the current flowing through the inductor when there is voltage fluctuation on the DC bus are obtained respectively.

In an embodiment of the present disclosure, when considering PV voltage fluctuation, the expression of the current flowing through the inductor without voltage fluctuation on the DC bus is as follows, i.e. the first calculation formula includes:

$$\Delta I_{L1} = \frac{1}{L} \cdot [\overline{U_{pv}}*D_0*T - (\overline{U_{dc}} - \overline{U_{pv}})*(1 - D_0)*T] \quad \text{relation 14}$$

In an embodiment of the present disclosure, when considering the PV voltage fluctuation, the expression of the current flowing through the inductor with or without the voltage fluctuation of the DC bus is as follows, that is, the second calculation formula includes:

$$\Delta I_{L2} = \frac{1}{L}\{(\overline{U_{pv}} + \widetilde{U_{pv}})*(D_0 + \Delta D1)* \quad \text{relation 15}$$
$$T - [(\overline{U_{dc}} + \widetilde{U_{dc}}) - (\overline{U_{pv}} + \widetilde{U_{pv}})]*[1 - (D_0 + \Delta D1)]*T\}$$

Herein, $\Delta I_{L1}$ is the current flowing through the inductor when there is no voltage fluctuation on the DC bus in the CCM mode; $\Delta I_{L2}$ is the current flowing through the inductor when there is voltage fluctuation on the DC bus in the CCM mode; L is an inductance value of the inductor; $U_{pv}$ is the PV voltage; T is a PWM period; $U_{dc}$ is a DC bus voltage; $\overline{U_{dc}}$ is a DC magnitude of the DC bus voltage; $\widetilde{U_{dc}}$ is an AC magnitude of the DC bus voltage; $\Delta D1$ is a first PWM compensation duty ratio.

In S402, the first PWM compensation duty ratio is obtained by combining the first calculation formula with the second calculation formula.

In an embodiment of the present disclosure, the relation 14 and the relation 15 are combined, that is, letting the relation 14 be equal to the relation 15, $$\Delta D1 = \frac{\widetilde{U_{dc}}*(1 - D_0) - \widetilde{U_{pv}}}{\overline{U_{dc}} + \widetilde{U_{dc}}} = \frac{(U_{dc} - \overline{U_{dc}})*(1 - D_0) - (U_{pv} - \overline{U_{pv}})}{U_{dc}}.$$

That is, the first PWM compensation duty ratio includes:

$$\Delta D1 = \frac{(U_{dc} - \overline{U_{dc}})*(1 - D_0) - (U_{pv} - \overline{U_{pv}})}{U_{dc}}. \quad \text{Relation 16}$$

In an embodiment of the present disclosure, the relation 14 and the relation 15 may be equal because the relation 15 is obtained by adding the compensation $\Delta D1$, however, only the fluctuation is reduced while not affecting the value of current flowing through the inductor.

In S403, the first PWM compensation duty ratio is used as the output compensation amount in the CCM mode.

2. Boost Works in the DCM Mode.

Optionally, when there is PV voltage fluctuation, calculating the output compensation amount according to the current working mode of the inverter Boost circuit further includes S501-S503.

In S501, in the DCM mode, a seventh calculation formula corresponding to the current flowing through the inductor when there is no voltage fluctuation on the DC bus and an eighth calculation formula corresponding to the current flowing through the inductor when there is voltage fluctuation on the DC bus are obtained respectively.

In an embodiment of the present disclosure, when considering the PV voltage fluctuation, the expression of the current flowing through the inductor without voltage fluctuation on the DC bus in the DCM mode is as follows, that is, the seventh calculation formula includes:

$$\Delta I_{L5} = \frac{(\overline{U_{pv}} * \overline{U_{dc}}) * D_0^2 * T}{L*(\overline{U_{dc}} - \overline{U_{pv}})} \quad \text{relation 17}$$

In an embodiment of the present disclosure, when considering the PV voltage fluctuation, the expression of the current flowing through the inductor in the DCM mode with or without voltage fluctuation is as follows, that is, the eighth calculation formula includes:

$$\Delta I_{L6} = \frac{[(\overline{U_{pv}} + \widetilde{U_{pv}})*}{(\overline{U_{dc}} + \widetilde{U_{dc}})]} * (D_0 + \Delta D2)^2 * T}{L*[(\overline{U_{dc}} + \widetilde{U_{dc}}) - (\overline{U_{pv}} + \widetilde{U_{pv}})]}$$ relation 18

Herein, $\Delta I_{L5}$ is the current flowing through the inductor when there is no voltage fluctuation on the DC bus in a case that there is PV voltage fluctuation in the DCM mode; $\Delta I_{L6}$ is the current flowing through the inductor when there is voltage fluctuation on the DC bus in a case that there is PV voltage fluctuation in the DCM mode; L is the inductance value of the inductor; $U_{pv}$ is the PV voltage (i.e. input voltage on DC side of inverter); T is the PWM period; $U_{dc}$ is the DC bus voltage; $\overline{U_{dc}}$ is the DC magnitude of the DC bus voltage; $\widetilde{U_{dc}}$ is the AC magnitude of the DC bus voltage; $\Delta D2$ is a second PWM compensation duty ratio.

In S502, the seventh calculation formula and the eighth calculation formula are combined to obtain a second PWM compensation duty ratio.

In an embodiment of the present disclosure, the relation 17 and the relation 18 are combined, that is, letting the relation 17=the relation 18, it can be derived as:

$$\Delta D2 = \frac{(\overline{U_{pv}}^2 * \widetilde{U_{dc}} - \overline{U_{dc}}^2 * \widetilde{U_{pv}} - \widetilde{U_{pv}} * \widetilde{U_{dc}} * \overline{U_{dc}} + \widetilde{U_{pv}} * \widetilde{U_{dc}} * \overline{U_{pv}})}{2*(\overline{U_{pv}} + \widetilde{U_{pv}})*(\overline{U_{dc}} + \widetilde{U_{dc}})*(\overline{U_{dc}} - \overline{U_{pv}})} * D_0 = \frac{\overline{U_{pv}}^2*(U_{dc}-\overline{U_{dc}}) - \overline{U_{dc}}^2*(U_{pv}-\overline{U_{pv}}) + (U_{pv}-\overline{U_{pv}})*(U_{dc}-\overline{U_{dc}}) *(\overline{U_{dc}} - \overline{U_{pv}}))}{2*U_{pv}*U_{dc}*(\overline{U_{dc}}-\overline{U_{pv}})} * D_0.$$

That is, the second PWM compensation duty ratio includes:

$$\Delta D2 = \frac{\overline{U_{pv}}^2 *(U_{dc}-\overline{U_{dc}}) - \overline{U_{dc}}^2*(U_{pv}-\overline{U_{pv}}) + (U_{pv}-\overline{U_{pv}})*(U_{dc}-\overline{U_{dc}})*(\overline{U_{dc}}-U_{pv})}{2*U_{pv}*U_{dc}*(\overline{U_{dc}}-U_{pv})} * D_0;$$ relation 19

In an embodiment of the present disclosure, the relation 17 and the relation 18 may be equal because the relation 18 is obtained through adding the compensation ΔD2, however, only the fluctuation is reduced while not affecting the value of current flowing through the inductor.

In S503, the second PWM compensation duty ratio is used as the output compensation amount in the DCM mode.

In an embodiment of the present disclosure, the boost control PWM compensation duty ratio can be obtained by integrating the above-mentioned cases 1 and 2 considering the PV voltage fluctuation:

$$\Delta D = \begin{cases} \frac{(U_{dc}-\overline{U_{dc}})*(1-D_0)-(U_{pv}-\overline{U_{pv}})}{U_{dc}} \\ \frac{\overline{U_{pv}}^2*(U_{dc}-\overline{U_{dc}}) - \overline{U_{dc}}^2*(U_{pv}-\overline{U_{pv}}) + (U_{pv}-\overline{U_{pv}})*(U_{dc}-\overline{U_{dc}})*(\overline{U_{dc}}-U_{pv}))}{2*U_{pv}*U_{dc}*(\overline{U_{dc}}-U_{pv})} * D_0 \end{cases}$$

The upper equation is valid for Continuous Current Mode CCM, the lower equation for Discontinuous Current Mode DCM.

In S103, the output compensation amount is superimposed on a control output amount of the Boost circuit;

In S104, the Boost circuit is controlled through the control output amount superimposed with the output compensation amount.

In an embodiment of the present disclosure, after calculating the compensation amount in different working modes through the aforementioned step S102, the compensation amount can be superimposed on the control output amount of the Boost circuit to control the Boost circuit.

In embodiments of the present disclosure, the scheme of the present disclosure will be described in detail below through specific embodiments.

The Boost circuit shown in FIG. 3 (a) and FIG. 3 (b) includes PV voltage source 1, boost inductor 2, IGBT 3, anti-reflection diode 4, bus capacitor 5 and bus voltage 6. The improved boost control block diagram shown in FIG. 4 includes PV voltage reference 2a, PV voltage 2b, bus voltage 2c, PV voltage loop PI controller 2d, PV current reference 2e, PV current 2f, PV current loop PI controller 2g, controller output duty 2h, and duty compensation control 2i.

Figure 4:
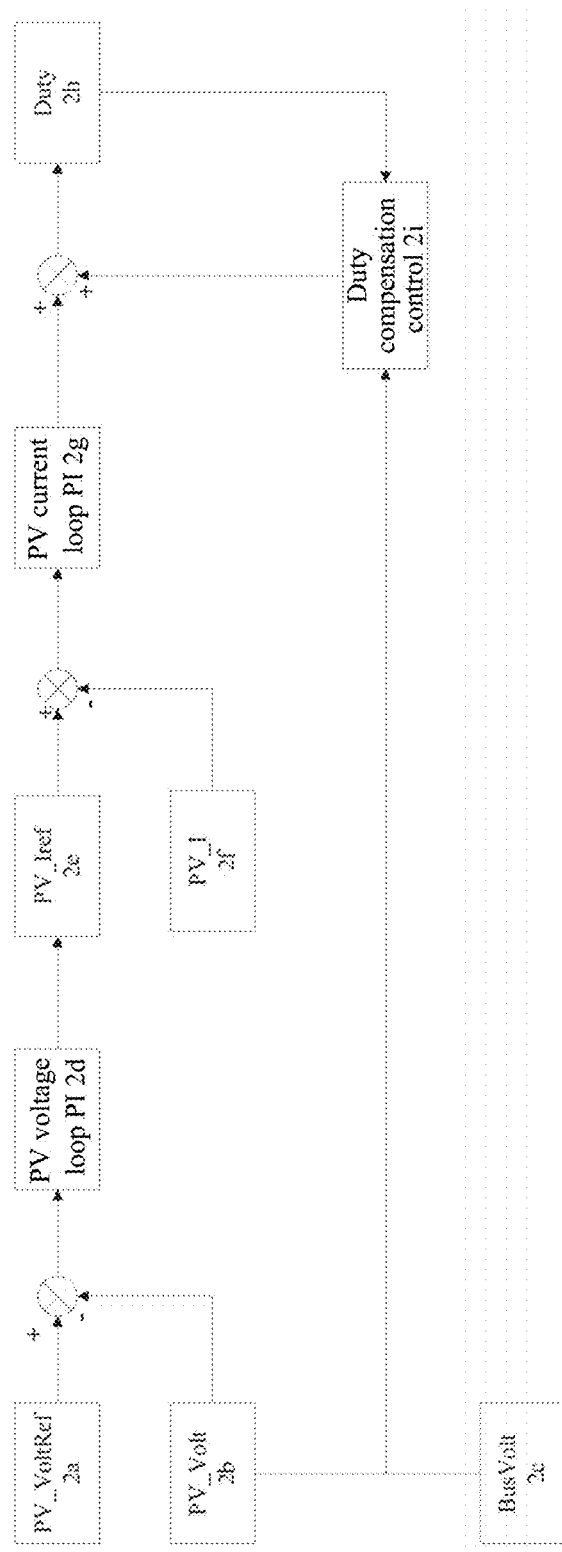
FIG. 4 is an improved boost control block diagram according to an embodiment of the present disclosure.

Without adding additional voltage or current sensors, it is only needed to add the compensation amount to the boost control output according to the current state mode of the inverter Boost circuit (CCM mode or DCM mode) when the Boost circuit operates, so as to suppress the bus voltage secondary ripple. Therefore, a hardware circuit of the embodiment of the disclosure can use the currently existing Boost circuit. As shown in FIG. 4, compared with the present control method, the bus voltage ripple of 100 Hz is reduced through the added duty compensation control 2i. The duty compensation control can be divided into the following steps.

In S11, it is determined whether the inverter Boost circuit is in CCM mode or DCM mode.

In S12, it is determined whether PV voltage fluctuates at this time.

In S13, according to the determination results of S11 and S12, duty compensation control (2i) is performed according to the relations that have been derived in the above content.

Herein, PV voltage has no fluctuation, and duty compensation control (2i) satisfies:

$$\Delta D = \begin{cases} \frac{U_{dc}-\overline{U_{dc}}}{U_{dc}}*(1-D_0) & \text{CCM mode} \\ \frac{(U_{dc}-\overline{U_{dc}}+U_{pv})*D_0}{2*(\overline{U_{dc}}-U_{pv})*U_{dc}} & \text{DCM mode} \end{cases}$$

PV voltage fluctuates, and duty compensation control (2i) meets:

$$\Delta D = \begin{cases} \dfrac{(U_{dc} - \overline{U_{dc}}) * (1 - D_0) - (U_{pv} - \overline{U_{pv}})}{U_{dc}} \\ \dfrac{\overline{U_{pv}}^2 * (U_{dc} - \overline{U_{dc}}) -}{\overline{U_{dc}}^2 * (U_{pv} - \overline{U_{pv}}) -} \\ \dfrac{(U_{pv} - \overline{U_{pv}}) * (U_{dc} - \overline{U_{dc}}) *}{(\overline{U_{dc}} - \overline{U_{pv}}))} * D_0 \\ \dfrac{2 * U_{pv} * U_{dc} * (\overline{U_{dc}} - \overline{U_{pv}})}{} \end{cases}$$

The upper equation is valid for Continuous Current Mode CCM, the lower equation for Discontinuous Current Mode DCM.

Herein, Udc and Upv in the relation can be obtained by DSP sampling, $\overline{U_{dc}}$ is the average value of Udc, and $\overline{U_{pv}}$ is the average value of Upv, and both of them can be obtained by the calculation for the average value.

In S14, the output of duty compensation control (2i) is superimposed on the output of PV current loop pi (2g) to obtain the final boost control duty (2h).

In embodiments of the present disclosure, in order to better show the results of the embodiments of the present disclosure, an example is given to illustrate. The main parameters are as follows:

Two-stage photovoltaic inverter structure, inverter with H5 topology;
PV voltage of 250 V, PV reference voltage of 200 V;
Power grid: voltage 230 V.

In the control mode of FIG. 4, the simulation results of the ratios of bus voltage ripples to maximum values and minimum values of bus voltages are as follows.

Figure 5:
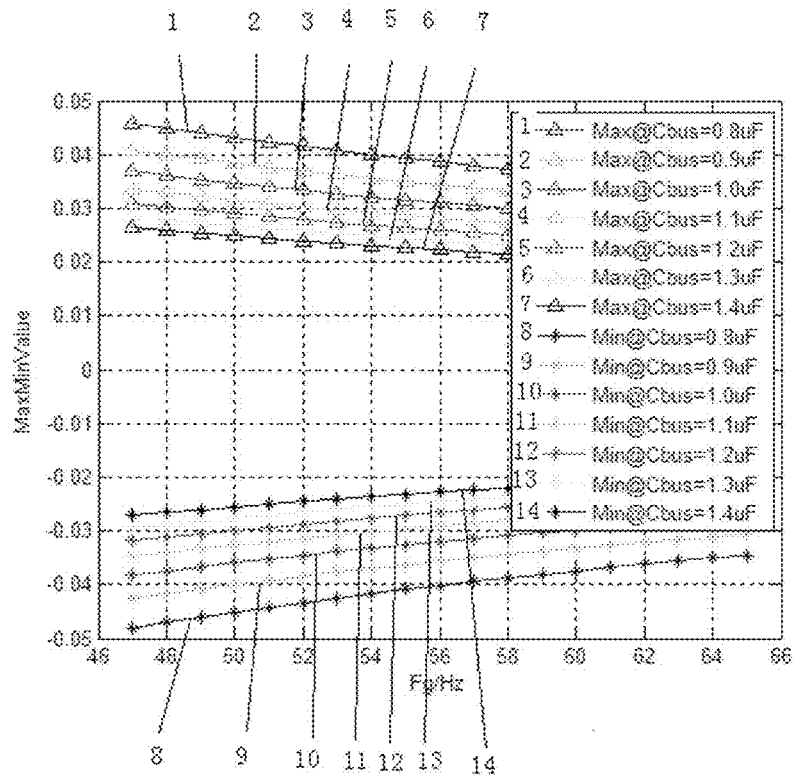
FIG. 5 is a schematic diagram of simulation results under different power grid frequencies and different bus capacitances according to an embodiment of the present disclosure.

The simulation results are shown in FIG. 5 in cases of different power grid frequencies and different bus capacitances.

Figure 6:
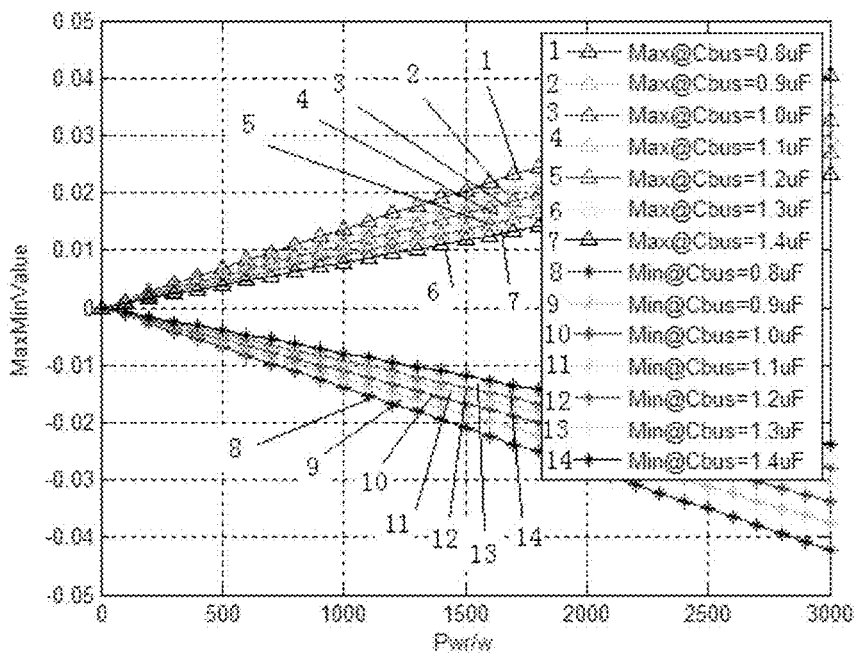
FIG. 6 is a schematic diagram of simulation results under different powers and different bus capacitances conditions according to an embodiment of the present disclosure.

In cases of different powers and different bus capacitances, the simulation results are shown in FIG. 6.

Figure 7:
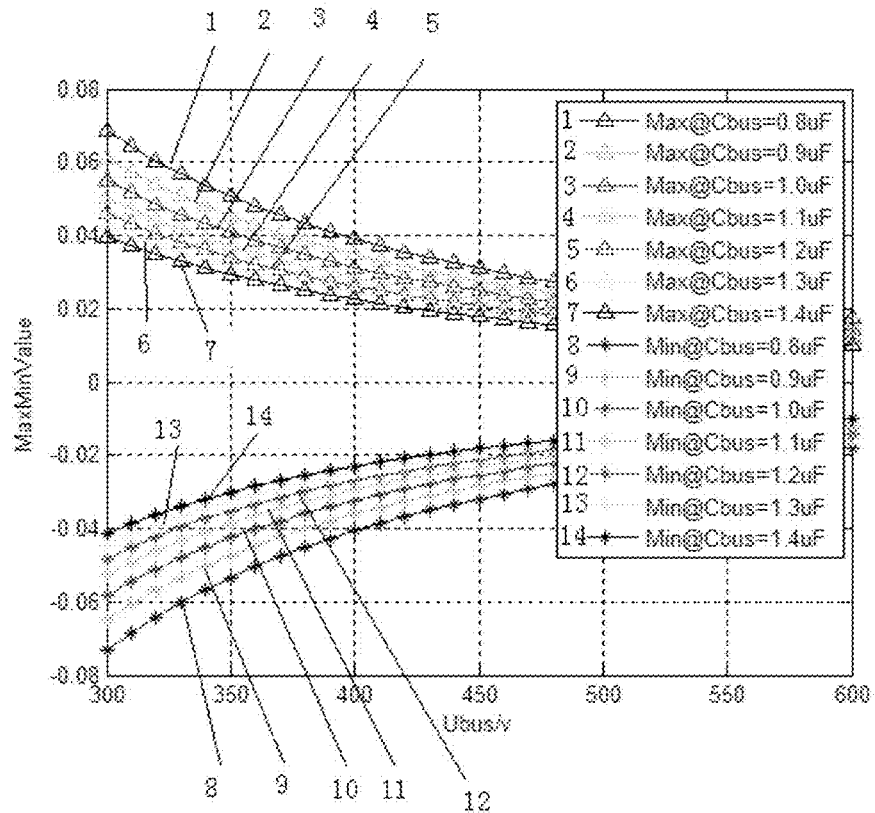
FIG. 7 is a schematic diagram of simulation results under different bus voltages and different bus capacitances according to an embodiment of the present disclosure.

In cases of different bus voltages and different bus capacitances, the simulation results are shown in FIG. 7.

From the simulation results, it can be seen that, with the scheme of the embodiment of the disclosure, the bus standard voltage is about 365V in practical application, and the ratio of the ripple to the bus voltage is about 0.04 at this time.

Figure 8:
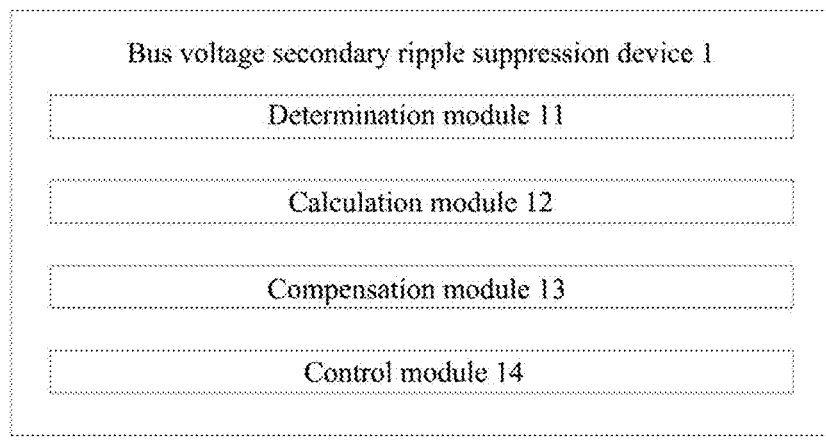
FIG. 8 is a block diagram of a bus voltage secondary ripple suppression device according to an embodiment of the present disclosure.

An embodiment of the disclosure also provides a bus voltage secondary ripple suppression device 1. As shown in FIG. 8, the device may include a determination module 11, a calculation module 12, a compensation module 13, and a control module 14.

The determination module 11 is configured to determine a current working mode of an inverter Boost circuit; wherein the working mode includes a continuous current mode (CCM) and a discontinuous current mode (DCM).

The calculation module 12 is configured to calculate an output compensation amount according to the current working mode of the inverter Boost circuit.

The compensation module 13 is configured to superimpose the output compensation amount on a control output amount of the Boost circuit.

The control module 14 is configured to control the Boost circuit through the control output amount superimposed with the output compensation amount.

Optionally, that the determination module 11 determines the current working mode of the inverter Boost circuit may include:

when the DC bus voltage $U_{dc}$ and the DC input PV voltage $U_{pv}$ of the inverter Boost circuit meet: $U_{dc}*(1-D_0) = U_{pv}$, it is determined that the inverter Boost circuit is in the CCM mode;

it is determined that the inverter Boost circuit is in the DCM mode when the DC bus voltage $U_{dc}$ and the DC input PV voltage $U_{pv}$ of the inverter Boost circuit meet:

$$U_{dc}*(1-D_0) > U_{pv};$$

wherein $D_0$ is a duty ratio of Pulse Width Modulation (PWM).

Optionally, that the calculation module 12 calculates the output compensation amount according to the current working mode of the inverter Boost circuit may include:

in the CCM mode, a first calculation formula corresponding to the current flowing through the inductor when there is no voltage fluctuation on the DC bus and a second calculation formula corresponding to the current flowing through the inductor when there is voltage fluctuation on the DC bus are obtained respectively;

a first PWM compensation duty ratio is obtained according to the first calculation formula and the second calculation formula;

the first PWM compensation duty ratio is used as the output compensation amount in the CCM mode.

Optionally, when there is no PV voltage fluctuation:
the first calculation formula includes:

$$\Delta I_{L1} = \frac{1}{L}[U_{pv} * D_0 * T - (\overline{U_{dc}} - U_{pv}) * (1 - D_0) * T];$$

the second calculation formula includes:

$$\Delta I_{L2} = \frac{1}{L}\left\{U_{pv} * (D_0 + \Delta D1) * T - \left[\left(\overline{U_{dc}} + \widetilde{U_{dc}}\right) - U_{pv}\right] * [1 - (D_0 + \Delta D1)] * T\right\};$$

the first PWM compensation duty ratio includes:

$$\Delta D1 = \frac{U_{dc} - \overline{U_{dc}}}{U_{dc}} * (1 - D_0).$$

Herein, $\Delta I_{L1}$ is the current flowing through the inductor when there is no voltage fluctuation on the DC bus in the CCM mode; $\Delta I_{L2}$ is the current flowing through the inductor when there is voltage fluctuation on the DC bus in the CCM mode; L is an inductance value of the inductor; $U_{pv}$ is the PV voltage; T is a PWM period Udc is a DC bus voltage; $\overline{U_{dc}}$ is a DC magnitude of the DC bus voltage; $\widetilde{U_{dc}}$ is an AC magnitude of the DC bus voltage; $\Delta D1$ is a first PWM compensation duty ratio.

Optionally, when there is PV voltage fluctuations: $U_{pv} = \overline{U_{pv}} + \widetilde{U_{pv}}$;

the first calculation formula includes:

$$\Delta I_{L1} = \frac{1}{L}[\overline{U_{pv}} * D_0 * T - (\overline{U_{dc}} - \overline{U_{pv}}) * (1 - D_0) * T];$$

the second calculation formula includes:

$$\Delta I_{L2} = \frac{1}{L}\left\{\left(\overline{U_{pv}} + \widetilde{U_{pv}}\right)*(D_0 + \Delta D1)*T - \left[\left(\overline{U_{dc}} + \widetilde{U_{dc}}\right) - \left(\overline{U_{pv}} + \widetilde{U_{pv}}\right)\right]*[1-(D_0+\Delta D1)]*T\right\};$$

the first PWM compensation duty ratio includes:

$$\Delta D1 = \frac{(U_{dc} - \overline{U_{dc}})*(1-D_0) - (U_{pv} - \overline{U_{pv}})}{U_{dc}};$$

Herein, $\overline{U_{pv}}$ is a DC magnitude of PV voltage; $\widetilde{U_{pv}}$ is an AC magnitude of PV voltage.

Optionally, when there is no PV voltage fluctuations, that the calculation module 12 calculates the output compensation amount according to the current working mode of the inverter Boost circuit may further include:

in the DCM mode, a third calculation formula corresponding to the discharge current of the Boost circuit when the circuit is opened and a fourth calculation formula corresponding to the charge current of the Boost circuit when the circuit is closed are obtained respectively;

the periodic average current of the Boost circuit is obtained by combining the third calculation formula and the fourth calculation formula;

a fifth calculation formula corresponding to a current flowing through the inductor when there is no voltage fluctuation on the DC bus and a sixth calculation formula corresponding to a current flowing through the inductor when there is voltage fluctuation on the DC bus are obtained respectively, according to the periodic average current;

a second PWM compensation duty ratio is obtained by combining the fifth calculation formula and the sixth calculation formula;

the second PWM compensation duty ratio is used as the output compensation amount in the DCM mode.

Optionally, the third calculation formula includes:

$$I_{off} = \frac{(U_{dc} - U_{pv})*T'}{L};$$

the fourth calculation formula includes:

$$I_{on} = \frac{U_{pv}*D_0*T}{L};$$

the periodic average current of Boost circuit includes:

$$\bar{I} = \frac{U_{pv}*U_{dc}*D_0^2*T}{L*(U_{dc} - U_{pv})};$$

the fifth calculation formula includes:

$$\Delta I_{L3} = \frac{U_{pv}*\overline{U_{dc}}*D_0^2*T}{L*(\overline{U_{dc}} - U_{pv})};$$

the sixth calculation formula includes:

$$\Delta I_{L4} = \frac{U_{pv}*\left(\overline{U_{dc}} + \widetilde{U_{dc}}\right)*(D_0 + \Delta D2)^2*T}{L*\left(\overline{U_{dc}} + \widetilde{U_{dc}} - U_{pv}\right)};$$

the second PWM compensation duty ratio includes:

$$\Delta D2 = \frac{(U_{dc} - \overline{U_{dc}} + U_{pv})*D_0}{2*(\overline{U_{dc}} - U_{pv})*U_{dc}};$$

Herein, $\bar{I}$ is the periodic average current of the Boost circuit; $I_{on}$ is a charge current of the inductor; $I_{off}$ is a discharge current of the inductor; T' is a discharge time of the inductor; $\Delta I_{L3}$ is a current flowing through the inductor when there is no voltage fluctuation on the DC bus in a case that there is no the PV voltage fluctuation in the DCM mode; $\Delta I_{L4}$ is a current flowing through the inductor when there is voltage fluctuation on the DC bus in a case that there is no the PV voltage fluctuation in the DCM mode; $\Delta D2$ is a second PWM compensation duty ratio.

Optionally, when there is the PV voltage fluctuation:

that the calculation module 12 calculates the output compensation amount according to the current working mode of the inverter Boost circuit may further include:

in the DCM mode, a seventh calculation formula corresponding to a current flowing through the inductor when there is no voltage fluctuation on the DC bus and an eighth calculation formula corresponding to a current flowing through the inductor when there is voltage fluctuation on the DC bus are obtained respectively;

a second PWM compensation duty ratio is obtained by combining the seventh calculation formula and the eighth calculation formula;

the second PWM compensation duty ratio is used as the output compensation amount in the DCM mode.

Optionally, the seventh calculation formula includes:

$$\Delta I_{L5} = \frac{(\overline{U_{pv}}*\overline{U_{dc}})*D_0^2*T}{L*(\overline{U_{dc}} - \overline{U_{pv}})};$$

the eighth calculation formula includes:

$$\Delta I_{L6} = \frac{\left[\left(\overline{U_{pv}} + \widetilde{U_{pv}}\right)*\left(\overline{U_{dc}} + \widetilde{U_{dc}}\right)\right]*(D_0 + \Delta D2)^2*T}{L*\left[\left(\overline{U_{dc}} + \widetilde{U_{dc}}\right) - \left(\overline{U_{pv}} + \widetilde{U_{pv}}\right)\right]};$$

the second PWM compensation duty ratio includes:

$$\Delta D2 = \frac{\overline{U_{pv}}^2*(U_{dc} - \overline{U_{dc}}) - \overline{U_{dc}}^2*(U_{pv} - \overline{U_{pv}}) - (U_{pv} - \overline{U_{pv}})*(U_{dc} - \overline{U_{dc}})*(\overline{U_{dc}} - \overline{U_{pv}})}{2*U_{pv}*U_{dc}*(\overline{U_{dc}} - \overline{U_{pv}})}*D_0;$$

Herein, $\Delta I_{L5}$ is the current flowing through the inductor when there is no voltage fluctuation on the DC bus in a case that there is PV voltage fluctuation in the DCM mode; $\Delta I_{L6}$ is the current flowing through the inductor when there is the voltage fluctuation on the DC bus in a case that there is PV voltage fluctuation in the DCM mode.

An embodiment of the disclosure includes: determining a current working mode of an inverter Boost circuit; wherein the working mode includes a continuous current mode (CCM) and a discontinuous current mode (DCM); calculating an output compensation amount according to the current working mode of the inverter Boost circuit; superimposing the output compensation amount on a control output amount of the Boost circuit; controlling the Boost circuit through the control output amount superimposed with the output compensation amount. By to this embodiment, the third harmonic in the output current of the inverter is reduced, and the current output quality of the inverter is improved.

Although the disclosed embodiments of the present disclosure are described above, the contents are only those embodiments used for the convenience of understanding the present disclosure and are not intended to limit the present disclosure. Any person skilled in the art to which the present disclosure belongs may make any modifications and changes on the form and details of implementation mode without departing from the spirit and scope of the present disclosure, but the scope of protection of the present disclosure shall still be subject to the scope defined by the appended claims.

The invention claimed is:

1. A bus voltage ripple suppression method for suppressing a ripple of a DC bus voltage of a two stage photovoltaic (PV) inverter structure having a Boost circuit, comprising:
 determining a current working mode of the Boost circuit, wherein the current working mode comprises one of a continuous current mode (CCM) and a discontinuous current mode (DCM);
 calculating an output compensation amount according to the determined current working mode of the Boost circuit;
 superimposing the calculated output compensation amount on a control output amount of the Boost circuit; and
 controlling the Boost circuit through the control output amount superimposed with the output compensation amount,
 wherein determining the current working mode of the Boost circuit comprises:
 determining that the Boost circuit is in the CCM mode when the direct current (DC) bus voltage ($U_{dc}$) and a DC input PV voltage ($U_{pv}$) of the Boost circuit meet: $U_{dc}*(1-D_0)=U_{pv}$;
 determining that the Boost circuit is in the DCM mode when the DC bus voltage ($U_{dc}$) and the DC input PV voltage ($U_{pv}$) of the Boost circuit meet: $U_{dc}*(1-D_0)>U_{pv}$; wherein $D_0$ is a duty ratio of Pulse Width Modulation (PWM), and
 wherein calculating the output compensation amount according to the current working mode of the Boost circuit comprises:
 obtaining respectively a DC amount $\overline{U_{dc}}$ of the DC bus voltage when there is no voltage fluctuation on a DC bus at an output of the Boost circuit and the DC bus voltage $U_{dc}=\overline{U_{dc}}+\widetilde{U_{dc}}$ when there is voltage fluctuation on the DC bus;
 obtaining a PWM compensation duty ratio from the obtained DC amount $\overline{U_{dc}}$ of the DC bus voltage when there is no voltage fluctuation on the DC bus at an output of the Boost circuit, and the obtained DC bus voltage $U_{dc}$ when there is voltage fluctuation on the DC bus; and
 using the PWM compensation duty ratio as an output compensation amount.

2. The bus voltage ripple suppression method according to claim 1, wherein when there is no photovoltaic PV voltage fluctuation of the DC input PV voltage ($U_{pv}$) of the boost circuit:
 in the CCM mode a first PWM compensation duty ratio includes:

$$\Delta D1 = \frac{U_{dc} - \overline{U_{dc}}}{U_{dc}} * (1 - D_0)$$

wherein $U_{dc}=\overline{U_{dc}}+\widetilde{U_{dc}}$ is the DC bus voltage; $\overline{U_{dc}}$ is a DC magnitude of the DC bus voltage; $\widetilde{U_{dc}}$ is the alternating current (AC) magnitude of the DC bus voltage; and $\Delta D1$ is the first PWM compensation duty ratio.

3. The bus voltage ripple suppression method according to claim 1, wherein when there is a PV voltage fluctuation of the DC input PV voltage ($U_{pv}$) of the Boost circuit:

$$U_{pv}=\overline{U_{pv}}+\widetilde{U_{dc}};$$

in the CCM mode a first PWM compensation duty ratio includes:

$$\Delta D1 = \frac{(U_{dc} - \overline{U_{dc}}) * (1 - D_0) - (U_{pv} - \overline{U_{pv}})}{U_{dc}};$$

wherein, $\overline{U_{pv}}$ is a DC magnitude of the PV voltage; $\widetilde{U_{dc}}$ an AC magnitude of the PV voltage, $U_{pv}$ is the DC input photovoltaic (PV) voltage; $U_{dc}=\overline{U_{dc}}+\widetilde{U_{dc}}$ is the DC bus voltage; $\overline{U_{dc}}$ is the DC amount of the DC bus voltage; $\widetilde{U_{dc}}$ is the alternating current (AC) amount of the DC bus voltage; $\Delta D1$ is the first PWM compensation duty ratio.

4. The bus voltage ripple suppression method according to claim 1, wherein when there is no DC input PV voltage fluctuation of the DC input photovoltaic (PV) voltage ($U_{pv}$) of the boost circuit in the DCM mode a second PWM compensation duty ratio includes:

$$\Delta D2 = \frac{(U_{dc} - \overline{U_{dc}}) * U_{pv} * D_0}{2 * (\overline{U_{dc}} - U_{pv}) * U_{dc}};$$

wherein $U_{pv}$ is the DC input PV voltage; $U_{dc}=\overline{U_{dc}}+\widetilde{U_{dc}}$ is the DC bus voltage; $\overline{U_{dc}}$ is the DC amount of the DC bus voltage; $\widetilde{U_{dc}}$ is the alternating current (AC) amount of the DC bus voltage; and $\Delta D2$ is the second PWM compensation duty ratio.

5. The bus voltage secondary ripple suppression method according to claim 1, wherein when there is the DC input PV voltage fluctuation of the DC input PV voltage ($U_{pv}$) of the Boost circuit:

$$U_{pv} = \overline{U_{pv}} + \widetilde{U_{dc}};$$

in the DCM mode a second PWM compensation duty ratio includes:

$$\Delta D2 = \frac{(\overline{U_{pv}}^2 * (U_{dc} - \overline{U_{dc}}) - \overline{U_{dc}}^2 * (U_{pv} - \overline{U_{pv}}) - (U_{pv} - \overline{U_{pv}}) * (U_{dc} - \overline{U_{dc}}) * (\overline{U_{dc}} - \overline{U_{pv}}))}{2 * U_{pv} * U_{dc} * (\overline{U_{dc}} - \overline{U_{pv}})} * D_0;$$

wherein $\overline{U_{pv}}$ is the DC amount of the PV voltage; $\widetilde{U_{dc}}$ is an AC amount of the PV voltage $U_{pv}$ is the DC input PV voltage; $U_{dc} = \overline{U_{dc}} + \widetilde{U_{dc}}$ is the DC bus voltage; $\overline{U_{dc}}$ is the DC amount of the DC bus voltage; $\widetilde{U_{dc}}$ is the alternating current (AC) amount of the DC bus voltage; $\Delta D2$ is the second PWM compensation duty ratio.

6. A bus voltage ripple suppression device; configured to suppress the ripple of the DC bus voltage ($U_{dc}$) of a two-stage photovoltaic inverter structure having the Boost circuit by the method according to claim 1, the bus voltage ripple suppression device comprising: a determination module configured to determine a current working mode of the Boost circuit, wherein the current working mode comprises the continuous current mode (CCM) and the discontinuous current mode (DCM); a calculation module configured to calculate the output compensation amount according to the current working mode of the Boost circuit; a compensation module configured to superimpose the output compensation amount on the control output amount of the Boost circuit; and a control module configured to control the Boost circuit through the control output amount superimposed with the output compensation amount.

* * * * *